US010013818B2

(12) United States Patent
Duan et al.

(10) Patent No.: US 10,013,818 B2
(45) Date of Patent: Jul. 3, 2018

(54) SYSTEM, METHOD AND COMPUTER PROGRAM PRODUCT FOR DETECTING SWITCH STATUS OF VEHICLE WINDOW(S)

(71) Applicant: International Business Machines Corporation, Armonk, NY (US)

(72) Inventors: Ning Duan, Beijing (CN); Jing Chang Huang, Shanghai (CN); Peng Ji, Nanjing (CN); Shao Chun Li, Beijing (CN); Guotao Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/359,009

(22) Filed: Nov. 22, 2016

(65) Prior Publication Data

US 2018/0144561 A1 May 24, 2018

(51) Int. Cl.
*G01M 17/00* (2006.01)
*G07C 5/08* (2006.01)

(52) U.S. Cl.
CPC .................................... *G07C 5/08* (2013.01)

(58) Field of Classification Search
CPC ................. G07C 5/08; B60H 1/00764; B60H 2001/006; G08G 1/0965; G10K 11/1782; G10K 2210/128
USPC .......... 701/29.1, 36, 49; 340/425.5; 381/86, 381/94.1
See application file for complete search history.

(56) References Cited

U.S. PATENT DOCUMENTS 5,499,302 A 3/1996 Nagami et al.
2010/0082201 A1* 4/2010 Pfau ................. B60H 1/00764 701/36
2013/0223643 A1 8/2013 Sato et al.
2015/0177363 A1* 6/2015 Hermann ................. G01S 5/22 367/118
2015/0239320 A1 8/2015 Eisenhour et al.

FOREIGN PATENT DOCUMENTS

JP 2007-269102 A 10/2007
JP 5471745 B2 4/2014

OTHER PUBLICATIONS

Mel, et al. “The NIST Definition of Cloud Computing”. Recommendations of the National Institute of Standards and Technology. Nov. 16, 2015.

* cited by examiner

*Primary Examiner* — Gertrude Arthur Jeanglaude
(74) *Attorney, Agent, or Firm* — Yeen Tham, Esq.; McGinn IP Law Group, PLLC

(57) ABSTRACT

A method, system, and computer program product, include obtaining window status decision information based on vehicle interior background noise and determining switch status of the vehicle window(s) based on the obtained window status decision information.

25 Claims, 6 Drawing Sheets

SYSTEM, METHOD AND COMPUTER PROGRAM PRODUCT FOR DETECTING SWITCH STATUS OF VEHICLE WINDOW(S)

BACKGROUND

The present invention relates generally to a method for detecting switch status of vehicle window, and more particularly, but not by way of limitation, to a system, method, and computer program product for determining switch status of the vehicle window(s) based on the obtained window status decision information.

In the field of the Internet of Vehicles (IOV), intelligent transportation and location-based services (LBS), it is necessary to collect vehicle interior data, such as temperature, humidity, odor, light and air quality for providing convenient service to vehicles. However, once the vehicle window is open, the vehicle interior environment is easy to be influenced by outdoor environment, which leads to a big change to vehicle interior temperature, humidity, odor, light and air quality. Accordingly, there is a need to effectively detect the switching status of the vehicle windows.

SUMMARY

In an exemplary embodiment, the present invention can provide a computer-implemented method including collecting scene audio data in a vehicle, extracting vehicle interior background noise from the scene audio data, obtaining window status decision information based on the vehicle interior background noise, and determining switch status of the vehicle window(s) based on the obtained window status decision information.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
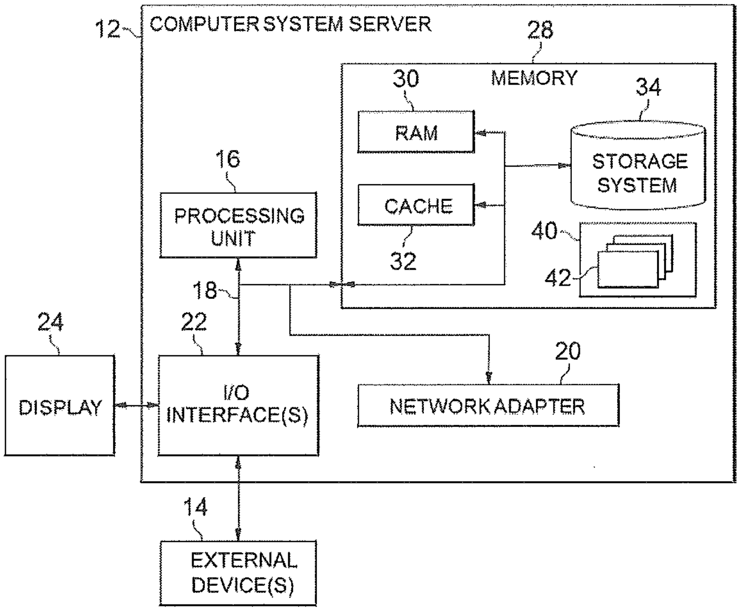
FIG. 1 depicts a cloud computing node 10 according to an embodiment of the present invention.

The invention will now be described with reference to FIG. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 2:
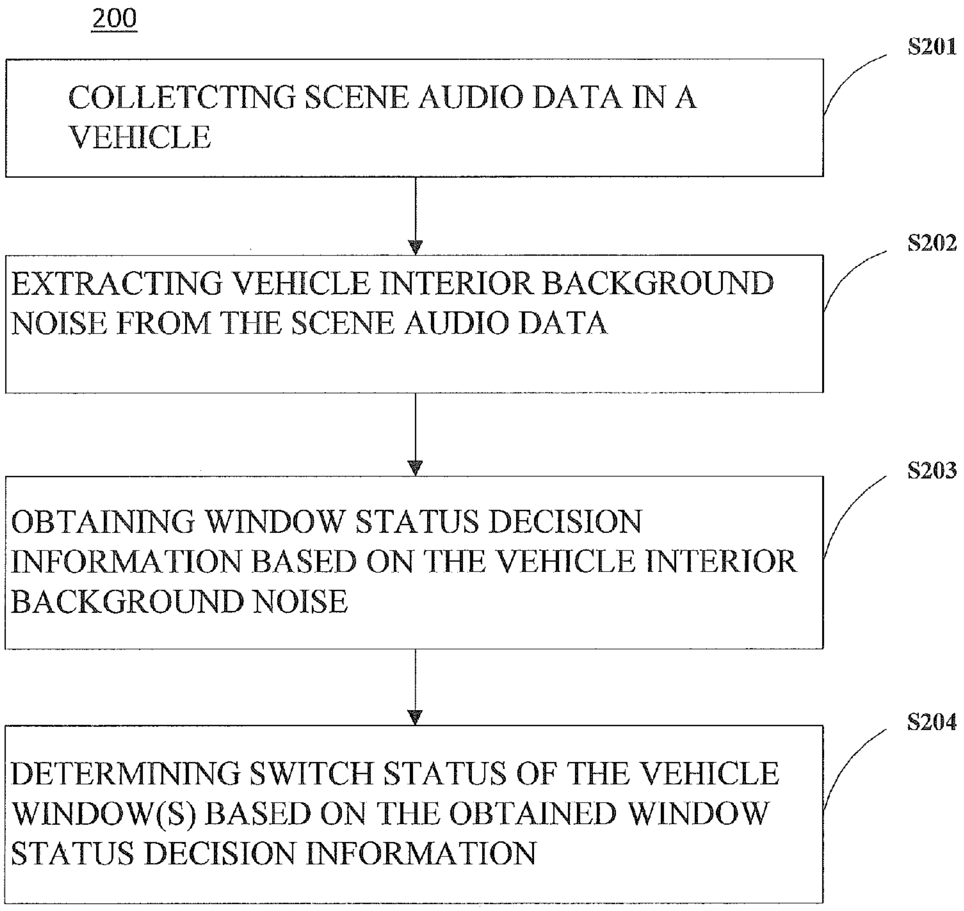
FIG. 2 shows a method for detecting vehicle window(s) status in accordance with an embodiment of the present disclosure.

With reference now to the example depicted in FIG. 2, the method 200 includes various steps to obtain window status decision information based on the vehicle interior background noise and determine switch status of the vehicle window(s) based on the obtained window status decision information. As shown in at least FIG. 1, one or more computers of a computer system 12 according to an embodiment of the present invention can include a memory 28 having instructions stored in a storage system to perform the steps of FIG. 2.

Although one or more embodiments (see e.g., FIGS. 1 and 5-6) may be implemented in a cloud environment 50 (see e.g., FIG. 5), it is nonetheless understood that the present invention can be implemented outside of the cloud environment.

The working principle of the existing vehicle window control device is to detect the power of the ignition switch of the vehicle and the trigger signal of the burglar alarm, and the automatic closing window function is realized by controlling the window electrode. However, these signals are dispersed distribution inside the vehicle, if install the window control device inside the vehicle, significant changes need to be made to the mechanical part and electrical equipment of the vehicle, such as adding some auxiliary detection devices and make changes to the wiring harness of the vehicle. Such changes may cause production cost increasing.

In order to address the above and other potential problems, embodiments of the present disclosure provide an effective and efficient solution for detecting switch status of vehicle window(s). Herein, the detection of switch status of vehicle window indicates the connectivity between the interior and exterior environment of a vehicle. By the method of this disclosure, if determining that at least one vehicle window is open, it indicates that the interior environment of a vehicle is connected with the exterior environment of a vehicle. If determining that all vehicle windows are closed, it indicates that the interior environment of a vehicle is not connected with the exterior environment of a vehicle. Generally speaking, the proposed solution works on the basis of vehicle interior background noise, which provides a light weighted and cost effective solution to effectively predict vehicle window status without making changes to the wiring harness of the vehicle. The following will be explained with reference to FIG. 2.

FIG. 2 shows a method for detecting switch status of vehicle window(s) in accordance with an embodiment of the present disclosure, the method comprising: in step S201, collecting scene audio data in a vehicle, in step S202, extracting vehicle interior background noise from the scene audio data, in step S203, obtaining window status decision info illation based on the vehicle interior background noise, and in step S204, determining switch status of the vehicle window(s) based on the obtained window status decision information.

It should be noted that, the steps in FIG. 2 may be implemented by remote server of service provider. After determining switch status of the vehicle window(s), the service provider may provide further service to the vehicle, such as alert the driver to close the window in the polluted air when determining the vehicle window is open. According to another embodiments of this disclosure, the steps in FIG. 2 may be implemented by some applications installed on in-vehicle electronic devices. These application can communicate with service provider and then provide further service.

At step S201, scene audio data in a vehicle is the audio data collected in the environment of a vehicle at sampling time points ($t_1$、$t_2$、$t_3$、. . . $t_n$), wherein sampling time interval between $t_n$ and $t_{n-1}$ may be set to be 1s or 10s which can be adjusted according to the practical requirement. Currently, in-vehicle electronic devices, such as on-vehicle navigation device, mobile phones, tablet computers, personal digital assistants (PDA) and the like have already been equipped with microphones, so scene audio data in a vehicle may be collected from microphones on in-vehicle electronic devices. It should be noted that, the collection of scene audio data should get permission from the user. The service provider who performs the collection should protect users' privacy and prevent the collected scene audio data from disclosing.

At step S202, extracting vehicle interior background noise from the scene audio data, specifically, extracting an audio feature from the scene audio data, according to one embodiment of the present disclosure, in time domain processing method, the audio feature may be energy. According to another embodiment of the present disclosure, in frequency domain processing method, the audio feature may be zero-crossing rate (ZCR), then comparing the audio feature with a first threshold. The person skilled in the art may understand that the first threshold may be different for different methods. In response to the audio feature is less than or equal to the first threshold, determining that the scene audio data comprises only vehicle interior background noise which is not mixed with foreground sound such as speech voice and/or mechanical noise, then acquiring background noise from the scene audio data. In response to the audio feature is more than the first threshold, determining that scene audio data is comprised of vehicle interior background noise and foreground sound, wherein the foreground sound may be comprised of speech voice and/or mechanical noise, then extracting background noise from the scene audio data. The person skilled in the art may understand, the extracting background noise from the scene audio data may be implemented by many ways, for example, but is not limited to, Minimal Tracking (MT) and Time Recursive (TR). The person skilled in the art may refer to any known or future developed method to extract vehicle interior background noise from the audio data.

At step S203, obtaining window status decision information based on the vehicle interior background noise, according to one embodiment of this disclosure, wherein the window status decision information comprises vehicle interior background noise intensity.

At step S204, according to one embodiment of this disclosure, determining switch status of the vehicle window(s) based on the obtained window status decision information comprises: determining switch status of the vehicle window based on the vehicle interior background noise intensity. Specifically, acquiring the vehicle interior background noise intensity at sampling time point $t_n$, then comparing the vehicle interior background noise intensity at sampling time point $t_n$ with a second threshold. In response to the vehicle interior background noise intensity being greater than or equal to the second threshold, determining that at least one vehicle window is open at sampling time point $t_n$. In response to the vehicle interior background noise intensity being less than or equal to a third threshold, determining that all vehicle windows are closed at sampling time point $t_n$, wherein the second threshold is greater than the third threshold. The second threshold and the third threshold are determined by those skilled in the art based on a large amount of data in practice.

As will be appreciated by one skilled in the art, there are many methods to acquire the vehicle interior background noise intensity at sampling time point $t_n$, for example, using decibel meter to acquire the vehicle interior background noise intensity. According to one embodiment of this disclosure, measure amplitudes ($A(t_1)$、$A(t_2)$、$A(t_3)$ . . . $A(t_n)$) of the vehicle interior background noise at sampling time points ($t_1$、$t_2$、$t_3$、. . . $t_n$), according to one embodiment of this disclosure, the vehicle interior background noise intensity may be determined by $Q(t)=A(t)^2$, accordingly, the vehicle interior background noise intensity at sampling time points ($t_1$、$t_2$、$t_3$、. . . $t_n$) may be acquired: $Q(t_1)=A(t_1)^2$, $Q(t_2)=A(t_2)^2$, $Q(t_3)=A(t_3)^2$, $A(t_n)^2$.

In step S204, according to one embodiment of this disclosure, wherein the determining switch status of the vehicle window(s) based on the obtained window status decision information comprises: determining switch status of the vehicle window(s) based on the vehicle interior background noise intensity and background noise intensity variation. Specifically, acquiring the vehicle interior background noise intensity $Q(t_n)$ at sampling time point $t_n$; in response to the vehicle interior background noise intensity $Q(t_n)$ being greater than the third threshold and less than the second threshold, acquiring the vehicle interior background noise intensity $Q(t_{n-1})$ at sampling time point $t_{n-1}$, wherein sampling time point $t_n$ and $t_{n-1}$ are adjacent sampling time points, $n \geq 1$, the time interval of sampling time point $t_n$ and $t_{n-1}$ may be adjusted according to practice requirement. In the following, acquiring the vehicle interior background noise intensity variation Delta ($t_n$) at sampling time point $t_n$, wherein Delta $(t_n)=Q(t_n)-Q(t_{n-1})$. In response to the vehicle interior background noise intensity variation Delta ($t_n$) at sampling time point $t_n$ being greater than a forth threshold, determining that at least one vehicle window is open at sampling time point $t_n$. In response to the vehicle interior background noise intensity variation Delta ($t_n$) at sampling time point $t_n$ being less than a fifth threshold, determining that all vehicle windows are closed at sampling time point $t_n$. Wherein the fourth and fifth threshold are determined by those skilled in the art based on a large amount of data in practice.

As described above, if the steps in FIG. 2 are implemented by remote service provider, then the collected scene audio data will be send to remote server of service provider for following process. In another embodiment, if the steps in FIG. 2 are implemented by the applications installed on in-vehicle electronic devices, then the collected scene audio data will be processed by these applications.

Figure 3:
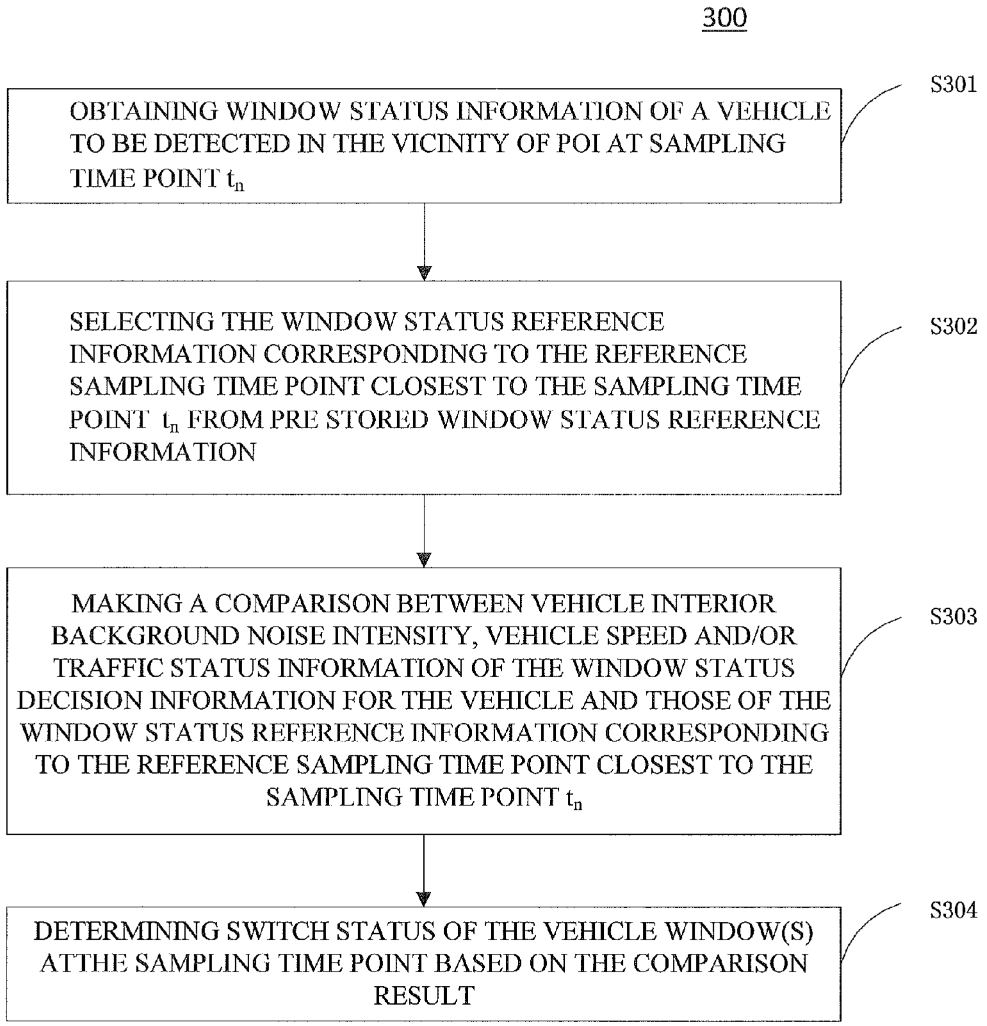
FIG. 3 shows a method for detecting vehicle window status based on the vehicle window status decision table in accordance with an embodiment of the present disclosure.

According to one embodiment of this disclosure, the window status decision information may further comprise vehicle speed and/or traffic status information. At step S204, according to one embodiment of this disclosure, wherein the determining switch status of the vehicle window(s) based on the obtained window status decision information comprises: determining the switch status of the vehicle window(s) based on the vehicle interior background noise intensity, vehicle speed and/or traffic status information. According to another embodiment of this disclosure, wherein the determining switch status of the vehicle window(s) based on the obtained window status decision information comprises: determining the switch status of the vehicle window(s) based on the vehicle interior background noise intensity, the vehicle interior background noise intensity variation, vehicle speed and/or traffic status information. FIG. 3 shows a method for detecting vehicle window status based on the obtained window status decision information in accordance with one embodiment of the present disclosure. At step 301, obtaining window status decision information of a vehicle in the vicinity of POI (point of interest) at a sampling time point $t_n$, wherein the vicinity of POI may be preset to be some distance from POI such as 500 meters. At step S302, selecting the window status reference information corresponding to the reference sampling time point closest to the sampling time point tn from pre stored window status reference information, according to one embodiment of this disclosure, wherein the window status reference information may comprise vehicle speed and/or traffic status information, the range of the vehicle interior background noise intensity for the sampling vehicles in the vicinity of POI at reference sampling time points (T1、T2、T3、. . . Tn) under the window-open/closed status. According to another embodiment of this disclosure, wherein the window status reference information may further comprise the range of vehicle interior background noise intensity variation for the sampling vehicles in the vicinity of POI at reference sampling time points (T1、T2、T3、. . . Tn) under the window open/closed status. Specifically, divide one day into several time slots (such as early peak, late peak and normal time), for each time slot, select a plurality of reference sampling time points (T1、T2、T3、. . . Tn), then detect the window status reference information, wherein the traffic status information of vicinity of POI may be obtained from traffic monitoring data of a common information platform, which is determined by moving speeds of vehicles in a current traffic road network, wherein the traffic status information is generally classified into several levels, such as congested, crawled, free flow, etc., the window status reference information is pre stored as the decision criterion for determining switch status of the vehicle window(s) for the vehicles in the vicinity of POI. At step S303, making a comparison between the vehicle interior background noise intensity, vehicle speed and/or traffic status information of the window status decision information for the vehicle and those of the window status reference information corresponding to the reference sampling time point closest to the sampling time point tn. At step S304, determining switch status of the vehicle window(s) based on the comparison result. By involving vehicle speed and/or traffic status information in the window status decision information, the prediction of vehicle window status is more accurate.

As will be appreciated by one skilled in the art, there are many methods to obtain vehicle speed when the sampling vehicles passing by the vicinity of POI at reference sampling time points ($T_1$、$T_2$、$T_3$、. . . $T_n$), for example, the vehicle speed can be read from in-vehicle speedometer. Alternatively, the vehicle speed can be calculated based on Global Positioning System (GPS) data collected from in-vehicle position sensing devices, specifically, obtain the actual driving distance of vehicles and driving time according to GPS coordinates collected from the sampling vehicles, then calculate the actual driving speed of the sampling vehicles. For example, for the sampling vehicle A, obtain GPS coordinates (x1, y1) at reference sampling time point $T_1$, and obtain GPS coordinates (x2, y2) at reference sampling time point ($T_1+\Delta t$), then actual driving distance of vehicles d is calculated to be $d=\sqrt{(x1-x2)^2+(y1-y2)^2}$ based on GPS coordinates (x1, y1) and (x2, y2), and vehicle speed at reference sampling time points T1 is calculated to be $$v = d/\Delta t.$$

For the sake of accuracy, select a plurality of sampling vehicles and calculate the average vehicle speed.

As will be appreciated by one skilled in the art, there are many methods to acquire the range of the vehicle interior background noise intensity and the range of the vehicle interior background noise intensity variation under the window open/closed status when the sampling vehicles passing by vicinity of POI at reference sampling time points ($T_1$、$T_2$、$T_3$、. . . $T_n$), for example, using decibel meter to acquire the background noise intensity. As described above, the vehicle interior background noise intensity may be obtained by measuring the background noise of the sampling vehicles, according to one embodiment of this disclosure, the background noise intensity $Q(t)=A(t)^2$, accordingly, the vehicle interior background noise intensity of the sampling vehicles at reference sampling time points ($T_1$、$T_2$、$T_3$、. . . $T_n$) can be acquired: $Q(T_1)=A(T_1)^2$, $Q(T_2)=A(T_2)^2$, $Q(T_3)=A(T_3)^2$, . . . $Q(T_n)=A(T_n)^2$. For the sake of accuracy, select a plurality of sampling vehicles and calculate the average vehicle interior background noise intensity. Further, according to the method described above, based on the vehicle interior background noise intensity, obtain the vehicle interior background noise intensity variation $Delta(T_1)$, $Delta(T_2)$, $Delta(T_3)$, . . . $Delta(T_n)$ at reference sampling time points ($T_1$、$T_2$、$T_3$、. . . $T_n$), wherein $Delta(T_n)=Q(T_n+\Delta t)-Q(T_n)$.

Figure 4:
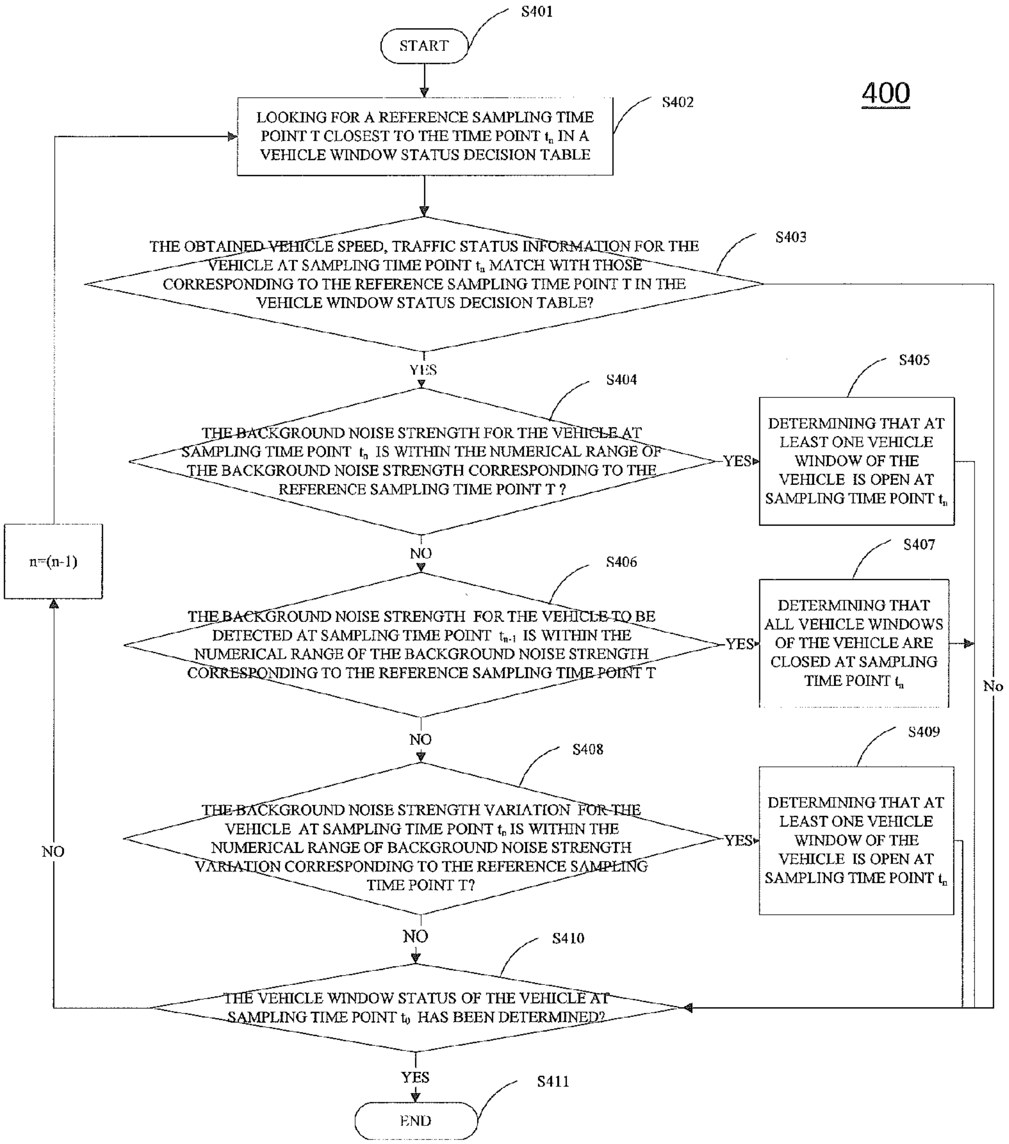
FIG. 4 shows flowchart of detecting the switch status of the vehicle window(s) based on the vehicle window status decision table in accordance with an embodiment of this invention.

According to one embodiment of this disclosure, the following vehicle window status decision table 1 shows pre stored window status reference information according to the embodiment of this invention. FIG. 4 shows flowchart of determining the switch status of the vehicle window(s) for the vehicle to be detected in the vicinity of POI based on the window status reference information in table 1 according to one embodiment of this invention.

Vehicle Window Status Decision Table 1

| reference sampling time points | time slots | traffic status information | vehicle speed (km/h) | background noise intensity | background noise intensity variation |
|---|---|---|---|---|---|
| T1 (7:00 Am) | early peak | congested | 30-40 | >60 DB | >20 |
| T2 (8:00 Am) | early peak | congested | 30-40 | >50 DB | >20 |
| T3 (9:00 Am) | early peak | congested | 40-50 | >50 DB | >20 |

At first, according to the embodiment described above, for a vehicle to be detected, obtain its vehicle speed, traffic status information, the background noise intensity Q1(t0), Q1(t1), Q1(t2), Q1(t3), . . . Q1(tn), and background noise intensity variation Delta(t0), Delta(t1), Delta(t2), Delta(t3), . . . Delta(tn) at sampling time points (t0、t1、t2、t3、. . . tn). The process begins at step S401, then proceed to step S402, looking for reference sampling time point T closest to sampling time point tn in a vehicle window status decision table. At step S403, it is determined whether the obtained vehicle speed, traffic status information match with those corresponding to the reference sampling time point T in the vehicle window status decision table, herein "match with" means that the obtained vehicle speed is within the numerical range of the vehicle speed corresponding to the reference sampling time point T in the vehicle window status decision table and the obtained traffic status information is the same as that corresponding to the reference sampling time point T in the vehicle window status decision table. If a result of determination is "NO", then proceed to step S410, if a result of determination is "YES", then at step S404, further, it is determined whether the background noise intensity for the vehicle at sampling time point tn is within the numerical range of the background noise intensity corresponding to the reference sampling time point T in the vehicle window status decision table. If a result of determination is "YES", then at step S405, it is determined that at least one vehicle window of the vehicle is open at sampling time point tn, then process proceed to step S410. If a result of determination is "NO", then process proceed to step S406, further, it is determined whether the background noise intensity for the vehicle at sampling time point tn−1 is within the numerical range of the background noise intensity corresponding to the reference sampling time point T in the vehicle window status decision table. If a result of determination is "YES", then at step S407, determining that all vehicle windows of the vehicle are closed at sampling time point tn, then process proceed to step S410. If a result of determination is "NO", then at step S408, further, it is determined whether the background noise intensity variation Delta(tn) for the vehicle at sampling time point tn is within the numerical range of the background noise intensity variation corresponding to the reference sampling time point T in the vehicle window status decision table. If a result of determination is "YES", then at step S409, it is determined that at least one vehicle window of the vehicle is open at sampling time point tn, then process proceed to step S410. At step S410, judging whether the vehicle window status of the vehicle at sampling time point t0 has been determined. If a judgment result is "NO", then proceed to determine the vehicle window status of the vehicle at time point tn−1. If a judgment result is "Yes", then the process ends at step S411.

It is also to be understood that the modules included in the device 500 may be implemented by various manners, including software, hardware, firmware or any combination thereof. For example, in some embodiments, one or more of the modules may be implemented by software and/or firmware. Alternatively, or in addition, one or more of the modules may be implemented by hardware such as an integrated circuit (IC) chip, an application-specific integrated circuit (ASIC), a system on chip (SOC), a field programmable gate array (FPGA), or the like.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
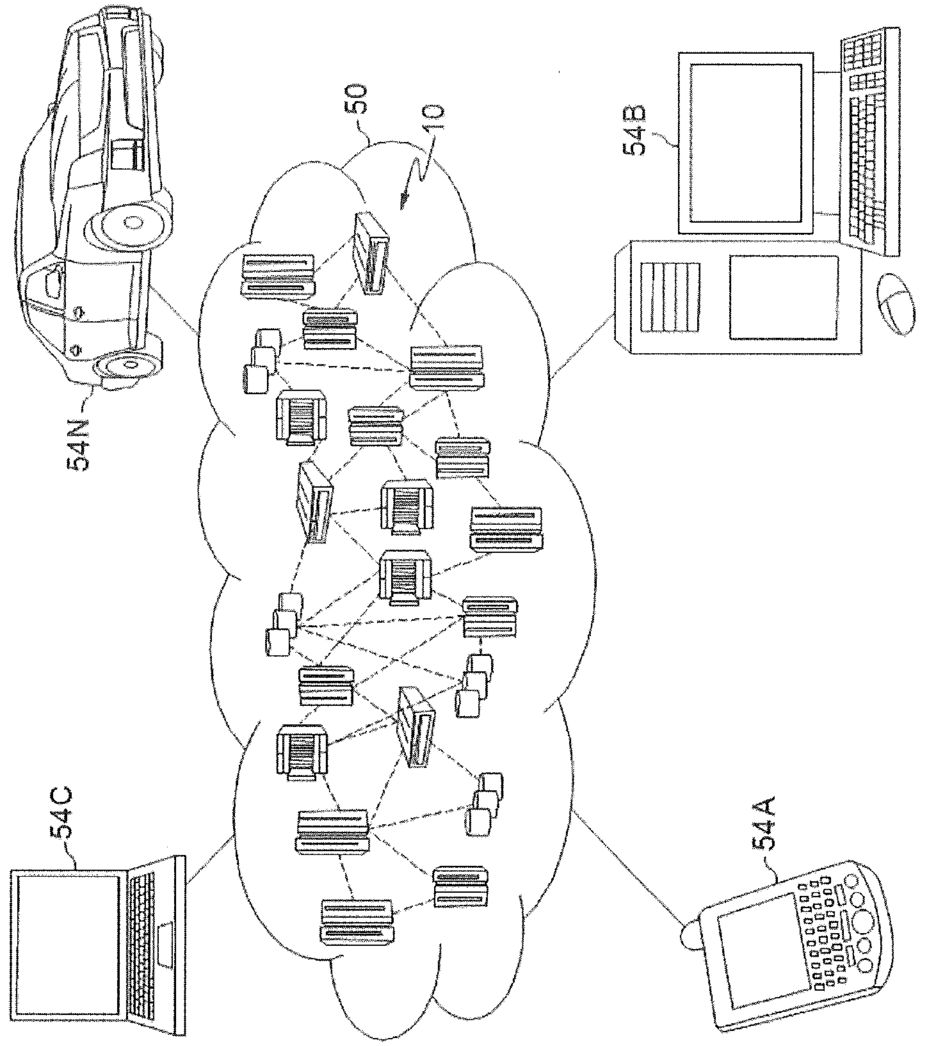
FIG. 5 depicts a cloud computing environment 50 according to an embodiment of the present invention.

Referring now to FIG. 5, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud-computing environment 50 can communicate with any type of computerized circuit over any type of network and/or network addressable connection (e.g., using a web browser).

Figure 6:
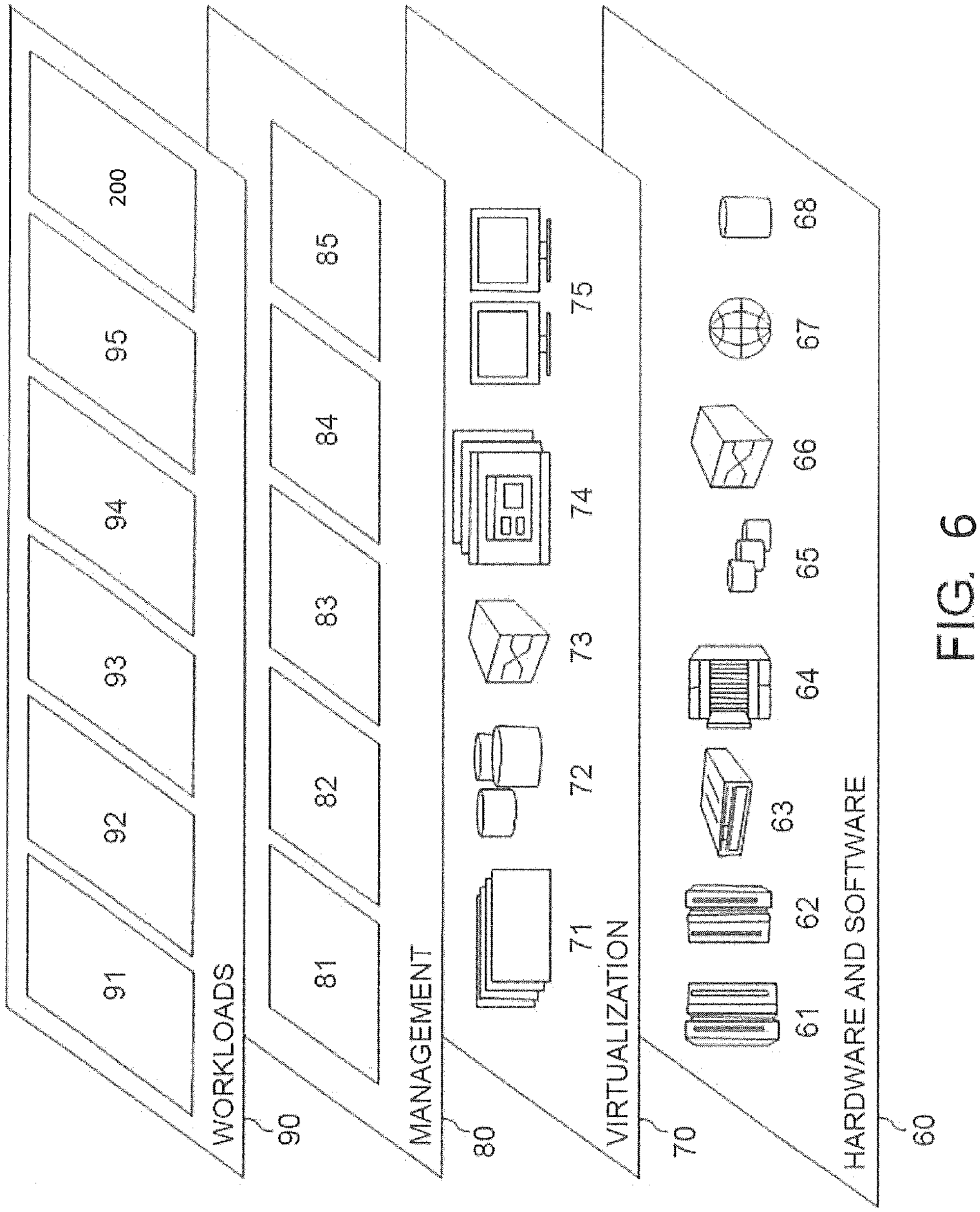
FIG. 6 depicts abstraction model layers according to an embodiment of the present invention.

Referring now to FIG. 6, an exemplary set of functional abstraction layers provided by cloud-computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the method 200.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be perform red on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method comprising:

collecting scene audio data in a vehicle;

extracting vehicle interior background noise from the scene audio data;

obtaining window status decision information based on the vehicle interior background noise and a determination of a connectivity between the vehicle interior and a vehicle exterior environment caused by the vehicle window(s) being in an open state; and determining switch status of the vehicle window(s) based on the obtained window status decision information.

2. The computer-implemented method of claim 1, wherein the collecting scene audio data in a vehicle further comprises:

collecting the scene audio data in a vehicle by using a microphone on in-vehicle electronic devices.

3. The computer-implemented method of claim 2, wherein the extracting vehicle interior background noise from the scene audio data further comprises:

in response to an audio feature of the scene audio data being less than or equal to a first threshold, determining that the scene audio data comprises only the vehicle interior background noise; and acquiring the vehicle interior background noise from the scene audio data.

4. The computer-implemented method of claim 3, wherein the extracting vehicle interior background noise from the scene audio data further comprises:

in response to the audio feature being greater than the first threshold, determining that the scene audio data comprises the vehicle interior background noise and foreground sound; and extracting the vehicle interior background noise from the scene audio data.

5. The computer-implemented method of claim 1, wherein the window status decision information comprises vehicle interior background noise intensity.

6. The computer-implemented method of claim 5, wherein the determining switch status of the vehicle window(s) based on the obtained window status decision information further comprises:

in response to the vehicle interior background noise intensity at sampling time point $t_n$ being greater than or equal to a second threshold, determining that at least one vehicle window is open at sampling time point $t_n$; or in response to the vehicle interior background noise intensity at sampling time point $t_n$ being less than or equal to a third threshold, determining that all vehicle windows are closed at sampling time point $t_n$, wherein the second threshold is greater than the third threshold.

7. The computer-implemented method of claim 5, wherein the determining switch status of the vehicle window(s) based on the obtained window status decision information further comprises:

in response to the vehicle interior background noise intensity $Q(t_n)$ at sampling time point $t_n$ being greater than the third threshold and less than the second threshold, acquiring the vehicle interior background noise intensity variation Delta $(t_n)$, wherein Delta $(t_n)=Q(t_n)-Q(t_{n-1})$, $Q(t_{n-1})$ is the vehicle interior background noise intensity at sampling time point $t_{n-1}$;

in response to the background noise intensity variation Delta $(t_n)$ at sampling time point $t_{n-1}$ being greater than a fourth threshold, determining that at least one vehicle window is open at sampling time point $t_n$; and in response to the background noise intensity variation Delta $(t_n)$ at sampling time point $t_{n-1}$ being less than a fifth threshold, determining that all vehicle windows are closed at sampling time point $t_n$.

8. The computer-implemented method of claim 5, wherein the window status decision information further comprises vehicle speed and/or traffic status information.

9. The computer-implemented method of claim 8, wherein the obtaining window status decision information based on the vehicle interior background noise further comprises:

obtaining window status decision information for the vehicle in a vicinity of Point of Interest (POI) at a sampling time point $t_n$.

10. The computer-implemented method of claim 9, wherein the determining switch status of the vehicle window(s) based on the obtained window status decision information further comprises:

selecting the window status reference information corresponding to a reference sampling time point closest to the sampling time point $t_n$ from pre-stored window status reference information;

making a comparison between the vehicle interior background noise intensity, vehicle speed and traffic status information of window status decision information for the vehicle and those of the window status reference information corresponding to the reference sampling time point closest to the sampling time point $t_n$: and determining the switch status of the vehicle window(s) at the sampling time point $t_n$ based on the comparison result.

11. The computer-implemented method of claim 1, embodied in a cloud-computing environment.

12. A system comprising:

a processor; and a memory, the memory storing instructions to cause the processor to perform:

collecting scene audio data in a vehicle;

extracting vehicle interior background noise from the scene audio data;

obtaining window status decision information based on the vehicle interior background noise and a determination of a connectivity between the vehicle interior and a vehicle exterior environment caused by the vehicle window(s) being in an open state; and determining switch status of the vehicle window(s) based on the obtained window status decision information.

13. The system of claim 12, wherein the memory further stores instructions to cause the processor to perform:

Collecting the scene audio data in a vehicle by using a microphone on in-vehicle electronic devices.

14. The system of claim 13, wherein the memory further stores instructions to cause the processor to perform:

in response to an audio feature of the scene audio data being less than or equal to a first threshold, determining that the scene audio data comprises only the vehicle interior background noise; and acquiring the vehicle interior background noise from the scene audio data.

15. The system of claim 12, wherein the memory further stores instructions to cause the processor to perform:

in response to the audio feature being greater than the first threshold, determining that the scene audio data comprises the vehicle interior background noise and foreground sound; and extracting the vehicle interior background noise from the scene audio data.

16. The system of claim 12, wherein the window status decision information comprises vehicle interior background noise intensity.

17. The system of claim 16, wherein the memory further stores instructions to cause the processor to perform the determining switch status of the vehicle window(s) based on the obtained window status decision information by:

in response to the vehicle interior background noise intensity at sampling time point $t_n$ being greater than or equal to a second threshold, determining that at least one vehicle window is open at sampling time point $t_n$; or in response to the vehicle interior background noise intensity at sampling time point $t_n$ being less than or equal to a third threshold, determining that all vehicle windows are closed at sampling time point $t_n$, wherein the second threshold is greater than the third threshold.

18. The system of claim 17, wherein the memory further stores instructions to cause the processor to perform the determining switch status of the vehicle window(s) based on the obtained window status decision information by:

in response to the vehicle interior background noise intensity $Q(t_n)$ at sampling time point $t_n$ being greater than the third threshold and less than the second threshold, acquiring the vehicle interior background noise intensity variation Delta $(t_n)$, wherein Delta $(t_n)=Q(t_n)-Q(t_{n-1})$, $Q(t_{n-1})$ is the vehicle interior background noise intensity at sampling time point $t_{n-1}$;

in response to the background noise intensity variation Delta $(t_n)$ at sampling time point $t_{n-1}$ being greater than a fourth threshold, determining that at least one vehicle window is open at sampling time point $t_n$; and in response to the background noise intensity variation Delta $(t_n)$ at sampling time point $t_{n-1}$ being less than a fifth threshold, determining that all vehicle windows are closed at sampling time point $t_n$.

19. The system of claim 16, wherein the window status decision information further comprises vehicle speed and/or traffic status information.

20. The system of claim 12, embodied in a cloud-computing environment.

21. A computer program product, the computer program product comprising a computer-readable storage medium having program instructions embodied therewith, the program instructions being executable by a computer to cause the computer to:

collecting scene audio data in a vehicle;

extracting vehicle interior background noise from the scene audio data;

obtaining window status decision information based on the vehicle interior background noise and a determination of a connectivity between the vehicle interior and a vehicle exterior environment caused by the vehicle window(s) being in an open state; and determining switch status of the vehicle window(s) based on the obtained window status decision information.

22. The computer program product of claim 21, wherein the window status decision information comprises vehicle interior background noise intensity.

23. The computer program product of claim 22, wherein the determining switch status of the vehicle window(s) based on the obtained window status decision information further comprises:

in response to the vehicle interior background noise intensity at sampling time point $t_n$ being greater than or equal to a second threshold, determining that at least one vehicle window is open at sampling time point $t_n$; or in response to the vehicle interior background noise intensity at sampling time point $t_n$ being less than or equal to a third threshold, determining that all vehicle windows are closed at sampling time point $t_n$, wherein the second threshold is greater than the third threshold.

24. A computer-implemented method comprising:

obtaining window status decision information based on vehicle interior background noise and a determination of a connectivity between the vehicle interior and a vehicle exterior environment caused by the vehicle window(s) being in an open state; and determining switch status of the vehicle window(s) based on the obtained window status decision information.

25. A computer program product, the computer program product comprising a computer-readable storage medium having program instructions embodied therewith, the program instructions being executable by a computer to cause the computer to:

obtaining window status decision information based on vehicle interior background noise and a determination of a connectivity between the vehicle interior and a vehicle exterior environment caused by the vehicle window(s) being in an open state; and determining switch status of the vehicle window(s) based on the obtained window status decision information.

* * * * *